(12) United States Patent
Nerurkar et al.

(10) Patent No.: US 11,017,610 B2
(45) Date of Patent: May 25, 2021

(54) SYSTEM AND METHOD FOR FAULT DETECTION AND RECOVERY FOR CONCURRENT ODOMETRY AND MAPPING

(71) Applicant: GOOGLE LLC, Mountain View, CA (US)

(72) Inventors: Esha Nerurkar, Mountain View, CA (US); Sheng Zhao, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/597,366

(22) Filed: May 17, 2017

(65) Prior Publication Data
US 2017/0337749 A1 Nov. 23, 2017

Related U.S. Application Data

(60) Provisional application No. 62/337,987, filed on May 18, 2016.

(51) Int. Cl.
*G06T 19/20* (2011.01)
*G06T 17/05* (2011.01)
(Continued)

(52) U.S. Cl.
CPC .............. *G06T 19/20* (2013.01); *G06F 3/011* (2013.01); *G06F 3/017* (2013.01); *G06F 3/038* (2013.01); *G06T 17/05* (2013.01)

(58) Field of Classification Search
CPC .................. G06T 17/05; G06T 19/20
(Continued)

(56) References Cited

U.S. PATENT DOCUMENTS 6,474,159 B1 11/2002 Foxlin et al.
7,015,831 B2 * 3/2006 Karlsson ................ G01C 21/12
318/568.11
(Continued)

FOREIGN PATENT DOCUMENTS

CN 102426019 A 4/2012
CN 102541256 A 7/2012
(Continued)

OTHER PUBLICATIONS

Blas et al., Fault-tolerant 3D Mapping with Application to an Orchard Robot, Jul. 3, 2009, Proceedings of the 7th IFAC Symposium on Fault Detection, Supervision and Safety of Technical Processes, pp. 893-898 (Year: 2009).*
(Continued)

*Primary Examiner* — Matthew Salvucci (57) ABSTRACT

An electronic device detects and recovers from fault conditions while tracking its motion and building a map of its environment. A front-end motion tracking module detects fault conditions while tracking motion over time and provides mapping data to a back-end mapping module. The front-end motion tracking module indicates to the back-end mapping module when a fault condition has been detected and when the fault condition is no longer detected. The back-end mapping module generates maps from the mapping data and merges the maps to build a three-dimensional representation of the environment. The back-end mapping module buffers or discards any mapping data received from the front-end motion tracking module during the existence of a fault condition. The back-end mapping module merges the maps generated based on mapping data received before and after the fault condition and adds the merged maps to the three-dimensional representation of the environment.

18 Claims, 6 Drawing Sheets

(51) Int. Cl.
  *G06F 3/01* (2006.01)
  *G06F 3/038* (2013.01)
(58) Field of Classification Search
  USPC .......................................................... 345/419
  See application file for complete search history.

(56) References Cited

U.S. PATENT DOCUMENTS

| | | | |
|---|---|---|---|
| 7,395,181 | B2 | 7/2008 | Foxlin et al. |
| 9,197,891 | B1 | 11/2015 | Namboodiri |
| 9,552,648 | B1 | 1/2017 | Zhang et al. |
| 10,073,531 | B2 | 9/2018 | Hesch et al. |
| 2007/0076267 | A1 | 4/2007 | Pierce et al. |
| 2008/0012935 | A1 | 1/2008 | Echtenkamp |
| 2010/0094460 | A1 | 4/2010 | Choi et al. |
| 2012/0194644 | A1 | 8/2012 | Newcombe et al. |
| 2013/0332064 | A1* | 12/2013 | Funk .................... G01C 21/206 701/409 |
| 2014/0119598 | A1* | 5/2014 | Ramachandran ....... G06T 11/60 382/103 |
| 2014/0281779 | A1 | 9/2014 | Wellman |
| 2014/0379256 | A1* | 12/2014 | Stipes .................... G01C 21/32 701/501 |
| 2015/0071524 | A1 | 3/2015 | Lee |
| 2015/0098614 | A1* | 4/2015 | Gee .................... G06K 9/00624 382/103 |
| 2015/0193949 | A1 | 7/2015 | Katz et al. |
| 2015/0285636 | A1* | 10/2015 | Funk .................... G01C 21/206 701/519 |
| 2015/0285638 | A1* | 10/2015 | Funk .................... G01C 21/206 701/409 |
| 2015/0366527 | A1 | 12/2015 | Yu et al. |
| 2016/0086385 | A1* | 3/2016 | Gourlay .................. G06T 19/20 382/154 |
| 2016/0307328 | A1* | 10/2016 | Moeglein ............. H04W 4/029 |
| 2016/0364124 | A1 | 12/2016 | Heater |
| 2017/0039765 | A1* | 2/2017 | Zhou .................... G06T 19/006 |
| 2017/0046594 | A1 | 2/2017 | Nerurkar et al. |
| 2017/0053538 | A1* | 2/2017 | Samarasekera .... G06K 9/00637 |
| 2018/0075643 | A1* | 3/2018 | Sequeira ................. G06T 15/10 |
| 2018/0089904 | A1* | 3/2018 | Jurgenson ................ G06T 7/20 |
| 2018/0143756 | A1* | 5/2018 | Mildrew ............. G06F 3/04815 |

FOREIGN PATENT DOCUMENTS

| | | |
|---|---|---|
| CN | 104520913 A | 4/2015 |
| CN | 104811683 A | 7/2015 |
| CN | 103472478 A | 12/2015 |
| CN | 105424026 A | 3/2016 |
| WO | 2015164696 A1 | 10/2015 |

OTHER PUBLICATIONS

Invitation to Restrict or Pay Additional Fees, and, Where Applicable, Protest Fee mailed Mar. 7, 2018 for PCT Application No. PCT/US2017/033299, 5 pages.
Written Opinion of the International Preliminary Examining Authority dated Apr. 30, 2018 for PCT Application No. PCT/US2017/033321, 5 pages.
Written Opinion of the International Preliminary Examining Authority dated May 2, 2018 for PCT/US2017/033299, 11 pages.
International Preliminary Report on Patentability dated May 8, 2018 for PCT/US2017/033357, 16 pages.
U.S. Appl. No. 15/596,016, filed May 16, 2017, listing Mingyang Li et al., as inventors, entitled "Real-Time Visual-Inertial Motion Tracking Fault Detection".
U.S. Appl. No. 15/595,617, filed May 15, 2017, listing Esha Nerurkar et al., as inventors, entitled "System and Method for Concurrent Odometry and Mapping".
Joel A. Hesch et al., "Consistency Analysis and Improvement of Vision-Aided Inertial Navigation", IEEE Transactions on Robotics, vol. 30, No. 1, Feb. 2013, 19 pages.
Salim Sirtkaya et al., "Loosely Coupled Kalman Filtering for Fusion of Visual Odometry and Inertial Navigation", Proceedings of the 16th International Conference on Information Fusion, Jul. 9-12, 2013, 8 pages.
Søren Riisgaard et al., "SLAM for Dummies: A Tutorial Approach to Simultaneous Localization and Mapping", Massachusetts Institute of Technology, 2004, 127 pages.
International Search Report and Written Opinion correlating to PCT/US17/033321, dated Jul. 28, 2017, 13 pages.
Lloyd Hayden Hughes, "Enhancing Mobile Camera Pose Estimation Through the Inclusion of Sensors", Thesis (MSc)-Stellenbosch University, Dec. 1, 2014, 115 pages.
International Search Report and Written Opinion correlating to PCT/US17/033357, dated Aug. 1, 2017, 16 pages.
International Search Report and Written Opinion dated Nov. 16, 2017 for PCT/US17/033299, 28 pages.
Li Mingyan, et al., "Real-time motion tracking on a cellphone using inertial sensing and a rolling-shutter camera", IEEE International Conference on Robotics and Automation, May 6-10, 2013, 8 pages.
Restriction Requirement dated Oct. 25, 2018 for U.S. Appl. No. 15/595,617, 5 pages.
Examination Report dated Dec. 10, 2018 for EP Application No. 17730978.8, 6 pages.
International Preliminary Report on Patentability dated Nov. 29, 2018 for PCT Application No. PCT/US2017/033299, 11 pages.
International Preliminary Report of Patentability dated Nov. 29, 2018 for PCT Application No. PCT/US2017/033321, 8 pages.
Non-Final Office Action dated Jan. 22, 2019 for U.S. Appl. No. 15/595,617, 15 pages.
Final Office Action dated Jun. 13, 2019 for U.S. Appl. No. 15/595,617, 17 pages.
Non-Final Office Action dated Sep. 9, 2019 for U.S. Appl. No. 15/596,016, 14 pages.
Notice of Allowance dated Jan. 31, 2020 for U.S. Appl. No. 15/595,617, 8 pages.
Non-Final Office Action dated Mar. 12, 2020 for U.S. Appl. No. 15/596,016, 14 pages.
Office Action dated Oct. 29, 2020 for Chinese Patent Application No. 201780013650.1, 18 pages.
Office Action dated Dec. 24, 2020 for Chinese Patent Application No. 201780013624.9, 19 pages.

* cited by examiner

SYSTEM AND METHOD FOR FAULT DETECTION AND RECOVERY FOR CONCURRENT ODOMETRY AND MAPPING

CROSS-REFERENCE TO RELATED APPLICATIONS

The present application is related to and claims priority to the following co-pending application, the entirety of which is incorporated by reference herein: U.S. Provisional Patent Application Ser. No. 62/337,987 (Attorney Docket No. 1500-G16013), entitled "Methods and Systems for VR/AR Functionality in a Portable Device."

BACKGROUND

Field of the Disclosure

The present disclosure relates generally to imagery capture and processing and more particularly to machine vision using captured imagery.

Description of the Related Art

Machine vision and display techniques, such as simultaneous localization and mapping (SLAM), structure from motion (SFM), visual inertial odometry (VIO), and visual inertial mapping, used for augmented reality (AR) and virtual reality (VR) applications, often rely on the identification of objects within the local environment of a device through the analysis of imagery of the local environment captured by the device. To support these techniques, the device navigates an environment while simultaneously constructing a map (3D visual representation) of the environment or augmenting an existing map or maps of the environment. However, faults can occur with visual and inertial sensors when tracking motion, leading to delays or inaccuracies in building a map of the environment based on the tracked motion. Such delays and inaccuracies can thereby limit the utility and effectiveness of the machine vision techniques.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

The following description is intended to convey a thorough understanding of the present disclosure by providing a number of specific embodiments and details involving the detection of and recovery from fault conditions when determining a relative position or relative orientation of an electronic device based on image-based identification of objects in a local environment of the electronic device. It is understood, however, that the present disclosure is not limited to these specific embodiments and details, which are examples only, and the scope of the disclosure is accordingly intended to be limited only by the following claims and equivalents thereof. It is further understood that one possessing ordinary skill in the art, in light of known systems and methods, would appreciate the use of the disclosure for its intended purposes and benefits in any number of alternative embodiments, depending upon specific design and other needs.

FIGS. 1-6 illustrate various techniques for detecting and recovering from fault conditions when tracking motion of an electronic device in an environment while building a three-dimensional representation of the environment. A front-end motion tracking module receives sensor data from visual, inertial, and depth sensors and tracks motion (i.e., estimates poses over time) of the electronic device that can be used by an application programming interface (API). The front-end motion tracking module estimates poses over time based on feature descriptors corresponding to the visual appearance of spatial features of objects in the environment and estimates the three-dimensional positions (referred to as 3D point positions) of the spatial features. The front-end motion tracking module also provides the captured feature descriptors and estimated device poses (collectively referred to as mapping data) to a back-end mapping module. The front-end motion tracking module also detects fault conditions in the received sensor data and indicates to the back-end mapping module when a fault condition has been detected and when the fault condition is no longer detected.

The back-end mapping module is configured to store a plurality of maps based on stored mapping data, and to receive additional mapping data from the front-end motion tracking module as it is generated while the electronic device moves through the environment. The back-end mapping module generates a map from each set of mapping data and merges the maps to build a three-dimensional representation (map) of the environment based on the stored plurality of maps and the generated maps. In response to receiving an indication from the front-end motion tracking module that a fault condition has been detected, the back-end mapping module buffers or discards any mapping data received from the front-end motion tracking module until the back-end mapping module receives an indication from the front-end motion tracking module that the fault condition is no longer detected. The back-end mapping module merges the maps generated based on mapping data received before and after the fault condition and adds the merged maps to the three-dimensional representation of the environment.

The back-end mapping module provides the three-dimensional visual representation of the environment to a localization module, which compares generated feature descriptors to stored feature descriptors from the stored plurality of maps, and identifies correspondences between stored and observed feature descriptors. The localization module performs a loop closure by minimizing discrepancies between matching feature descriptors to compute a localized pose. The localized pose corrects drift in the estimated pose generated by the front-end motion tracking module, and is periodically sent to the front-end motion tracking module for output to the API.

By detecting fault conditions and buffering or discarding mapping data generated during a fault condition, and merging maps based on data received before and after a fault condition, the electronic device can recover quickly from a fault condition to track motion and build maps of an environment with minimal disruption. To illustrate, in at least one embodiment the front-end motion tracking module detects a fault condition when the electronic device is changing direction at a higher rate than the rate at which the motion tracking module can generate accurate or reliable mapping data, for example, when the electronic device is shaken or waved back and forth quickly. In particular, the sensor data from the image and non-visual sensors during such a fault condition may be compromised or lack useful information, thereby impacting the accuracy or reliability of any maps based on such data Accordingly, upon detecting the fault condition, the front-end motion tracking module indicates to the back-end mapping module that a fault condition has been detected. In response to receiving the indication that the fault condition has been detected, the back-end mapping module initiates buffering or discarding of mapping data received from the front-end motion tracking module, such that the mapping data received subsequent to the indication of the fault condition is not used to build or adjust the back-end maps. When the front-end motion tracking module detects that the fault condition no longer exists, the front-end motion tracking module indicates to the back-end mapping module that the fault condition has resolved. In response to receiving an indication that the fault condition has resolved, the back-end mapping module discontinues buffering or discarding mapping data received from the front-end motion tracking module subsequent to receipt of the indication that the fault condition no longer exists, and resumes generating maps based on the mapping data received from the front-end motion tracking module. The back-end mapping module merges the map generated prior to receipt of the indication of the fault condition to the map generated subsequent to receipt of the indication that the fault condition has resolved. In some embodiments, the back-end mapping module merges the map generated subsequent to receipt of the indication that the fault condition has resolved to the three-dimensional representation of the environment.

Figure 1:
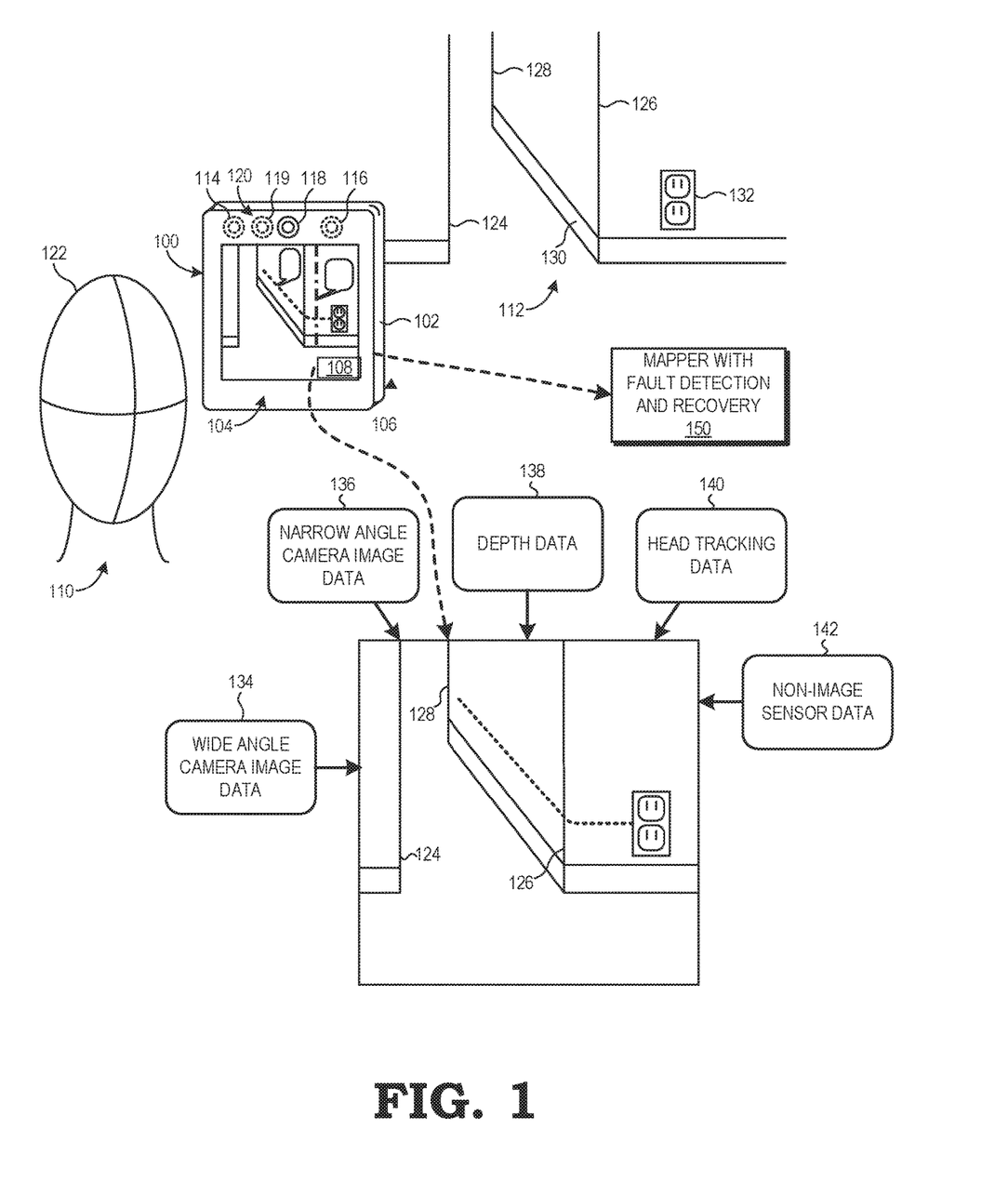
FIG. 1 is a diagram illustrating an electronic device configured to detect a fault condition when estimating a pose of an electronic device in a local environment using pose information generated based on non-image sensor data and image sensor data while building a map of the local environment and to recover once the fault condition has resolved in accordance with at least one embodiment of the present disclosure.

FIG. 1 illustrates an electronic device 100 configured to support location-based functionality using SLAM for AR/VR applications, using image and non-visual sensor data in accordance with at least one embodiment of the present disclosure. The electronic device 100 can include a user-portable mobile device, such as a tablet computer, computing-enabled cellular phone (e.g., a "smartphone"), a head-mounted display (HMD), a notebook computer, a personal digital assistant (PDA), a gaming system remote, a television remote, and the like. In other embodiments, the electronic device 100 can include another type of mobile device, such as an automobile, robot, remote-controlled drone or other airborne device, and the like. For ease of illustration, the electronic device 100 is generally described herein in the example context of a mobile device, such as a tablet computer or a smartphone; however, the electronic device 100 is not limited to these example implementations.

In the depicted example, the electronic device 100 includes a housing 102 having a surface 104 opposite another surface 106. In the example, thin rectangular block form-factor depicted, the surfaces 104 and 106 are substantially parallel and the housing 102 further includes four side surfaces (top, bottom, left, and right) between the surface 104 and surface 106. The housing 102 may be implemented in many other form factors, and the surfaces 104 and 106 may have a non-parallel orientation. For the illustrated tablet implementation, the electronic device 100 includes a display 108 disposed at the surface 106 for presenting visual information to a user 110. Accordingly, for ease of reference, the surface 106 is referred to herein as the "forward-facing" surface and the surface 104 is referred to herein as the "user-facing" surface as a reflection of this example orientation of the electronic device 100 relative to the user 110, although the orientation of these surfaces is not limited by these relational designations.

The electronic device 100 includes a plurality of sensors to obtain information regarding a local environment 112 of the electronic device 100. The electronic device 100 obtains visual information (imagery) for the local environment 112 via imaging sensors 114 and 116 and a depth sensor 120 disposed at the forward-facing surface 106 and an imaging sensor 118 disposed at the user-facing surface 104. In one embodiment, the imaging sensor 114 is implemented as a wide-angle imaging sensor having a fish-eye lens or other wide-angle lens to provide a wider-angle view of the local environment 112 facing the surface 106. The imaging sensor 116 is implemented as a narrow-angle imaging sensor having a typical angle of view lens to provide a narrower angle view of the local environment 112 facing the surface 106. Accordingly, the imaging sensor 114 and the imaging sensor 116 are also referred to herein as the "wide-angle imaging sensor 114" and the "narrow-angle imaging sensor 116," respectively. As described in greater detail below, the wide-angle imaging sensor 114 and the narrow-angle imaging sensor 116 can be positioned and oriented on the forward-facing surface 106 such that their fields of view overlap starting at a specified distance from the electronic device 100, thereby enabling depth sensing of objects in the local environment 112 that are positioned in the region of overlapping fields of view via image analysis. The imaging sensor 118 can be used to capture image data for the local environment 112 facing the surface 104. Further, in some embodiments, the imaging sensor 118 is configured for tracking the movements of the head 122 or for facial recognition, and thus providing head tracking information that may be used to adjust a view perspective of imagery presented via the display 108.

The depth sensor 120, in one embodiment, uses a modulated light projector 119 to project modulated light patterns from the forward-facing surface 106 into the local environment, and uses one or both of imaging sensors 114 and 116 to capture reflections of the modulated light patterns as they reflect back from objects in the local environment 112. These modulated light patterns can be either spatially-modulated light patterns or temporally-modulated light patterns. The captured reflections of the modulated light patterns are referred to herein as "depth imagery." The depth sensor 120 then may calculate the depths of the objects, that is, the distances of the objects from the electronic device 100, based on the analysis of the depth imagery. The resulting depth data obtained from the depth sensor 120 may be used to calibrate or otherwise augment depth information obtained from image analysis (e.g., stereoscopic analysis) of the image data captured by the imaging sensors 114 and 116. Alternatively, the depth data from the depth sensor 120 may be used in place of depth information obtained from image analysis. To illustrate, multiview analysis typically is more suited for bright lighting conditions and when the objects are relatively distant, whereas modulated light-based depth sensing is better suited for lower light conditions or when the observed objects are relatively close (e.g., within 4-5 meters). Thus, when the electronic device 100 senses that it is outdoors or otherwise in relatively good lighting conditions, the electronic device 100 may elect to use multiview analysis to determine object depths. Conversely, when the electronic device 100 senses that it is indoors or otherwise in relatively poor lighting conditions, the electronic device 100 may switch to using modulated light-based depth sensing via the depth sensor 120.

The electronic device 100 also may rely on non-visual pose information for pose detection. This non-visual pose information can be obtained by the electronic device 100 via one or more non-visual sensors (not shown in FIG. 1), such as an IMU including one or more gyroscopes, magnetometers, and accelerometers. In at least one embodiment, the IMU can be employed to generate pose information along multiple axes of motion, including translational axes, expressed as X, Y, and Z axes of a frame of reference for the electronic device 100, and rotational axes, expressed as roll, pitch, and yaw axes of the frame of reference for the electronic device 100. The non-visual sensors can also include ambient light sensors and location sensors, such as GPS sensors, or other sensors that can be used to identify a location of the electronic device 100, such as one or more wireless radios, cellular radios, and the like.

To facilitate fault detection and recovery, the electronic device 100 includes a mapper with fault detection and recovery 150 to detect fault conditions while tracking motion of the electronic device 100 based on the image sensor data 134, 136 and the non-image sensor data 142 and to build a three-dimensional representation of the local environment 112 that excludes mapping data collected during the existence of a detected fault condition. The mapper with fault detection and recovery 150 generates maps from sets of mapping data, and merges the maps to the three-dimensional representation of the local environment 112. In response to detecting the existence of a fault condition, the mapper with fault detection and recovery 150 buffers or discards mapping data generated during the existence of the fault condition, and resumes generating maps from sets of mapping data when the mapper with fault detection and recovery 150 no longer detects the existence of the fault condition. The mapper with fault detection and recovery 150 merges the last map generated prior to detection of the fault condition to the first map generated after the fault condition is no longer detected, and adds the pre- and post-fault condition maps to the three-dimensional representation of the local environment 112.

In operation, the electronic device 100 uses the image sensor data and the non-visual sensor data to track motion (estimate a pose) of the electronic device 100. In at least one embodiment, after a reset the electronic device 100 determines an initial estimated pose based on geolocation data, other non-visual sensor data, visual sensor data as described further below, or a combination thereof. As the pose of the electronic device 100 changes, the non-visual sensors generate, at a relatively high rate, non-visual pose information reflecting the changes in the device pose. Concurrently, the visual sensors capture images that also reflect device pose changes. Based on this non-visual and visual pose information, the electronic device 100 updates the initial estimated pose to reflect a current estimated pose, or tracked motion, of the device.

The electronic device 100 generates visual pose information based on the detection of spatial features in image data captured by one or more of the imaging sensors 114, 116, and 118. To illustrate, in the depicted example of FIG. 1 the local environment 112 includes a hallway of an office building that includes three corners 124, 126, and 128, a baseboard 130, and an electrical outlet 132. The user 110 has positioned and oriented the electronic device 100 so that the forward-facing imaging sensors 114 and 116 capture wide angle imaging sensor image data 134 and narrow angle imaging sensor image data 136, respectively, that includes these spatial features of the hallway. In this example, the depth sensor 120 also captures depth data 138 that reflects the relative distances of these spatial features relative to the current pose of the electronic device 100. Further, the user-facing imaging sensor 118 captures image data representing head tracking data 140 for the current pose of the head 122 of the user 110. Non-visual sensor data 142, such as readings from the IMU, also is collected by the electronic device 100 in its current pose.

From this input data, the electronic device 100 can determine an estimate of its relative pose, or tracked motion, without explicit absolute localization information from an external source. To illustrate, the electronic device 100 can perform analysis of the wide-angle imaging sensor image data 134 and the narrow-angle imaging sensor image data 136 to determine the distances between the electronic device 100 and the corners 124, 126, 128. Alternatively, the depth data 138 obtained from the depth sensor 120 can be used to determine the distances of the spatial features. From these distances the electronic device 100 can triangulate or otherwise infer its relative position in the office represented by the local environment 112. As another example, the electronic device 100 can identify spatial features present in one set of captured images of the image data 134 and 136, determine the initial distances to these spatial features, and then track the changes in position and distances of these spatial features in subsequent captured imagery to determine the change in pose of the electronic device 100 in a free frame of reference. In this approach, certain non-visual sensor data, such as gyroscopic data or accelerometer data, can be used to correlate spatial features observed in one image with spatial features observed in a subsequent image.

In at least one embodiment, the electronic device 100 uses the image data and the non-visual data to generate feature descriptors for the spatial features identified in the captured imagery. Each of the generated feature descriptors describes the orientation, gravity direction, scale, and other aspects of one or more of the identified spatial features. The generated feature descriptors are compared to a set of stored descriptors (referred to for purposes of description as "known feature descriptors") of a plurality of stored maps of the local environment 112 that each identifies previously identified spatial features and their corresponding poses. In at least one embodiment, each of the known feature descriptors is a descriptor that has previously been generated, and its pose definitively established, by either the electronic device 100 or another electronic device. The estimated device poses, 3D point positions, and known feature descriptors can be stored at the electronic device 100, at a remote server (which can combine data from multiple electronic devices) or other storage device, or a combination thereof. Accordingly, the comparison of the generated feature descriptors can be performed at the electronic device 100, at the remote server or other device, or a combination thereof.

In at least one embodiment, a generated feature descriptor is compared to a known feature descriptor by comparing each aspect of the generated feature descriptor (e.g., the orientation of the corresponding feature, the scale of the corresponding feature, and the like) to the corresponding aspect of the known feature descriptor and determining an error value indicating the variance between the compared features. Thus, for example, if the orientation of feature in the generated feature descriptor is identified by a vector A, and the orientation of the feature in the known feature descriptor is identified by a vector B, the electronic device 100 can identify an error value for the orientation aspect of the feature descriptors by calculating the difference between the vectors A and B. The error values can be combined according to a specified statistical technique, such as a least squares technique, to identify a combined error value for each known feature descriptor being compared, and the matching known feature descriptor identifies as the known feature descriptor having the smallest combined error value.

Each of the known feature descriptors includes one or more fields identifying the point position of the corresponding spatial feature and camera poses from which the corresponding spatial feature was seen. Thus, a known feature descriptor can include pose information indicating the location of the spatial feature within a specified coordinate system (e.g., a geographic coordinate system representing Earth) within a specified resolution (e.g., 1 cm), the orientation of the point of view of the spatial feature, the distance of the point of view from the feature and the like. The observed feature descriptors are compared to the feature descriptors stored in the map to identify multiple matched known feature descriptors. The matched known feature descriptors are then stored together with non-visual pose data as localization data that can be used both to correct drift in the tracked motion (or estimated pose) of the electronic device 100 and to augment the plurality of stored maps of a local environment for the electronic device 100.

In some scenarios, the matching process will identify multiple known feature descriptors that match corresponding generated feature descriptors, thus indicating that there are multiple features in the local environment of the electronic device 100 that have previously been identified. The corresponding poses of the matching known feature descriptors may vary, indicating that the electronic device 100 is not in a particular one of the poses indicated by the matching known feature descriptors. Accordingly, the electronic device 100 may refine its estimated pose by interpolating its pose between the poses indicated by the matching known feature descriptors using conventional interpolation techniques. In some scenarios, if the variance between matching known feature descriptors is above a threshold, the electronic device 100 may snap its estimated pose to the pose indicated by the known feature descriptors.

In at least one embodiment, the mapper with fault detection and recovery 150 generates estimated poses (i.e., tracks motion) of the electronic device 100 based on the image sensor data 134, 136 and the non-image sensor data 142 for output to an API. The mapper with fault detection and recovery 150 also generates feature descriptors based on the image sensor data and the non-visual sensor data and detects the existence of fault conditions based on the image sensor data and the non-visual sensor data. The mapper with fault detection and recovery 150 stores a plurality of maps containing known feature descriptors, from which it builds a three-dimensional representation of the local environment 112. For example, the mapper with fault detection and recovery 150 can use the known feature descriptors to generate a map file that indicates the position of each feature included in the known feature descriptors in a frame of reference for the electronic device 100. As the mapper with fault detection and recovery 150 generates new feature descriptors based on the image sensor data and the non-visual sensor data, it periodically augments the three-dimensional representation of the local environment 112 by matching the generated feature descriptors to the known feature descriptors.

Upon detection of a fault condition, the mapper with fault detection and recovery 150 buffers or discards mapping data generated during the existence of the fault condition, and resumes generating map files based on the mapping data after the mapper with fault detection and recovery 150 no longer detects the fault condition. The mapper with fault detection and recovery 150 merges the last map file generated before the fault condition to the first map file generated after the fault condition by obtaining visual correspondences (known as loop closure constraints) between the two map files. Once such constraints have been obtained, the mapper with fault detection and recovery 150 optimizes the two maps along with the inter-map constraints to accurately estimate the quantities of interest (trajectories, landmarks, calibration parameters).

The mapper with fault detection and recovery 150 augments the three-dimensional representation of the environment with the merged map files, excluding the mapping data generated during the fault condition. In this manner, the mapper with fault detection and recovery 150 detects fault conditions evidenced by the image sensor data and the non-visual sensor data as the image sensor data and the non-visual sensor data is generated, and quickly recovers from the fault condition to generate an accurate three-dimensional representation of the environment. The three-dimensional representation of the environment can be used to support any of a variety of location-based services. For example, in one embodiment the three-dimensional representation of the environment can be used to generate a virtual reality environment, or portion thereof, representing the local environment of the electronic device 100. The mapper with fault detection and recovery 150 is configured to detect fault conditions based on the image sensor data 134, 136, depth data 138, and non-visual sensor data 142, and to exclude data associated with a fault condition from the data which it uses to augment the three-dimensional representation of the environment. The mapper with fault detection and recovery 150 is further configured to detect when a fault condition is no longer present, and to resume augmenting the three-dimensional representation of the environment with image sensor data 134, 136, depth data 138, and non-visual sensor data 142 received subsequent to the fault condition no longer being present.

Figure 2:
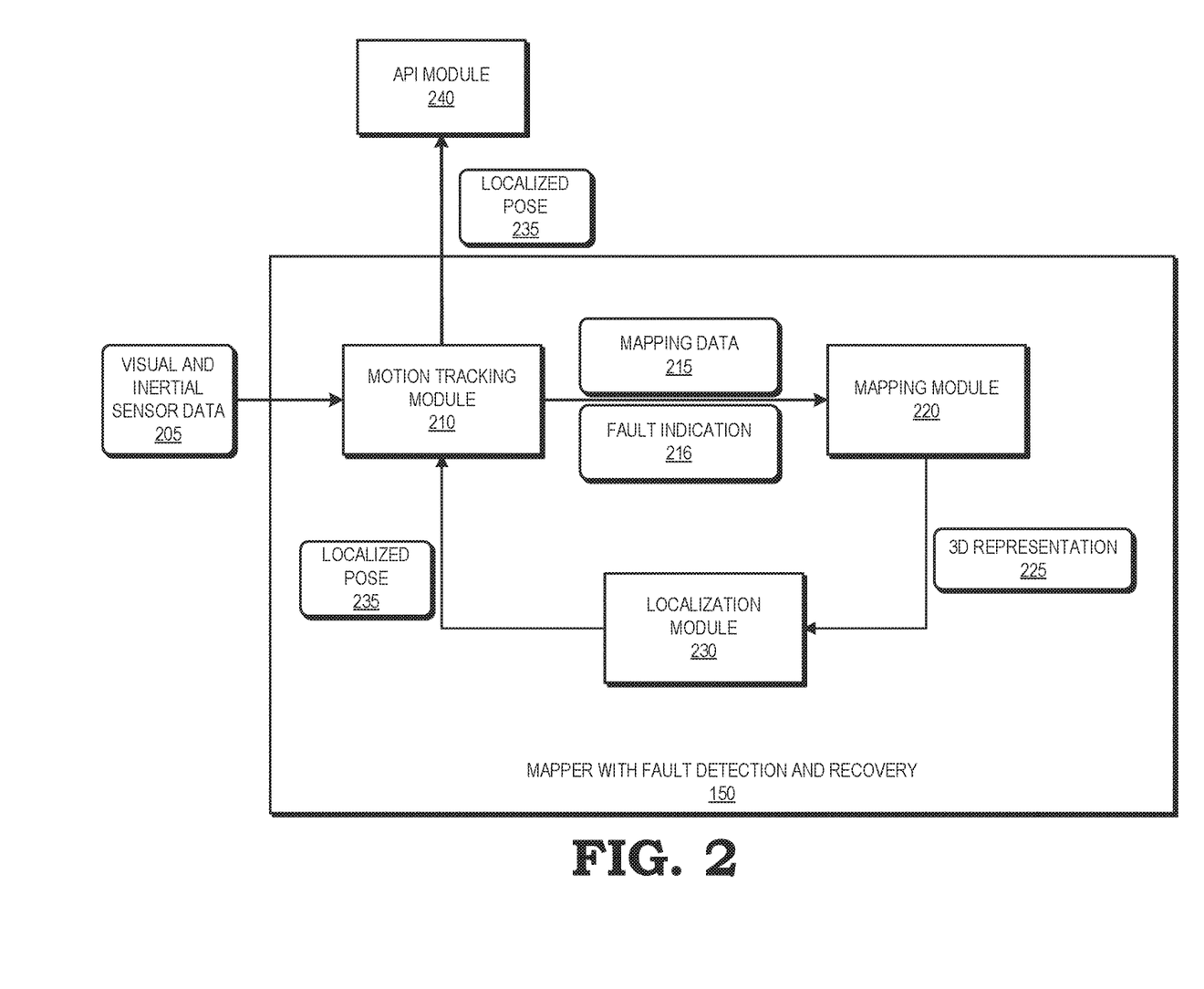
FIG. 2 is a diagram illustrating a mapper with fault detection and recovery of the electronic device of FIG. 1 configured to detect and recover from a fault in visual and inertial sensor data when estimating a current pose of the electronic device and updating a map of the environment to localize the estimated current pose in accordance with at least one embodiment of the present disclosure.

FIG. 2 illustrates the components of the mapper with fault detection and recovery 150 of the electronic device 100 of FIG. 1. The mapper with fault detection and recovery 250 includes a front-end motion tracking module 210, a back-end mapping module 220, and a localization module 230. The mapper with fault detection and recovery 250 is configured to output a current pose 214 to an API module 240. The mapper with fault detection and recovery 250 is configured to detect fault conditions while tracking motion to estimate a current pose of the electronic device and updating a map of the environment to localize the estimated current pose.

The front-end motion tracking module 210 is configured to receive visual sensor data 136 from the imaging cameras 114 and 116, depth data 138 from the depth sensor 120, and inertial sensor data 142 from the non-image sensors (not shown) of FIG. 1 (collectively, the visual sensor data 136, depth data 138, and inertial sensor data 142 is depicted in FIG. 2 as visual and inertial sensor data 205). The front-end motion tracking module 210 is further configured to detect fault conditions based on the visual and inertial sensor data 205. Based on the received visual and inertial sensor data 205, the front-end motion tracking module 210 generates mapping data 215 that includes feature descriptors of spatial features of objects in the local environment 112. In some embodiments, the mapping data 215 is grouped into sets, with each set including the mapping data collected within a given time period.

In some embodiments, the front-end motion tracking module 210 detects fault conditions at the same frequency as it receives sensor data. In some embodiments, the front-end motion tracking module 210 generates a fault indication 216 for each set of mapping data 215, wherein the fault indication 216 indicates that a fault condition exists when the front-end motion tracking module 210 detects a fault condition, and wherein the fault indication 216 indicates that a fault condition does not exist when the front-end motion tracking module 210 does not detect a fault condition. In some embodiments, the front-end motion tracking module generates a fault indication 216 only when a change in the existence of a fault condition is detected, i.e., when a fault condition is detected, and when the fault condition is no longer detected. In some embodiments, the fault indication 216 includes information concerning the type of fault that was detected. The front-end motion tracking module 210 provides the mapping data 215 and the fault indication 216 to the mapping module 220.

The mapping module 220 is configured to store a plurality of maps (not shown) including known feature descriptors and to receive mapping data 215 from the motion tracking module 210. The stored plurality of maps forms a compressed history of the environment and tracked motion of the electronic device 100. The mapping module 220 is configured to build a map of the environment based on each set of mapping data 215 received from the front-end motion tracking module 210. The mapping module 220 is further configured to merge the maps together. In some embodiments, the mapping module 220 receives mapping data 215 from the motion tracking module 210 periodically, for example, every five seconds. In some embodiments, the mapping module 220 receives mapping data 215 from the front-end motion tracking module 210 after a threshold amount of sensor data has been received by the front-end motion tracking module 210. The mapping module 220 builds a three-dimensional representation 225 of the local environment 112 of the electronic device 100 based on the merged maps built based on the mapping data 215 received from the motion tracking module 210 and the stored plurality of maps. The mapping module 220 matches one or more spatial features of the merged maps to spatial features of the plurality of stored maps to generate the three-dimensional representation 225 of the environment 112.

In response to receiving a fault indication 216 indicating that a fault condition has been detected by the front-end motion tracking module 210, the mapping module 220 builds a map file based on the last set of mapping data 215 received from the front-end motion tracking module before the fault indication 216. The mapping module 220 buffers or discards any mapping data 215 received from the front-end motion tracking module 210 during the existence of the fault condition. Once the front-end motion tracking module sends a fault indication 216 indicating that a fault condition no longer exists, the mapping module 220 discontinues buffering or discarding mapping data 215 received from the front-end motion tracking module 210 and builds a map file based on the first set of mapping data 215 received from the front-end motion tracking module after the indication that the fault condition no longer exists. The mapping module 220 then merges the map file based on the last set of mapping data 215 received from the front-end motion tracking module before the fault indication 216 with the map file based on the first set of mapping data 215 received from the front-end motion tracking module after the indication that the fault condition no longer exists by querying the localization module 230 to obtain visual correspondences (known as loop closure constraints) between the two map files. Once such constraints have been obtained, the mapper with fault detection and recovery 150 optimizes the two map files along with inter-map constraints to accurately estimate the quantities of interest (trajectories, landmarks, calibration parameters).

The localization module 230 is configured to use the matched descriptors to align the mapping data 215 with the stored plurality of maps, such as by applying a loop-closure algorithm. Thus, the localization module 230 can use matched feature descriptors to estimate a transformation for one or more of the stored plurality of maps, whereby the localization module 230 transforms geometric data associated with the generated feature descriptors of the mapping data 215 having matching descriptors to be aligned with geometric data associated with a stored map having a corresponding matching descriptor. When the localization module 230 finds a threshold number of matching feature descriptors from the mapping data 215 and a stored map to confirm that the generated mapping data 215 and the stored map contain descriptions of common visual landmarks, the localization module 230 performs a transformation between the mapping data 215 and the matching known feature descriptors, aligning the geometric data of the matching feature descriptors. Thereafter, the localization module 230 can apply a co-optimization algorithm to refine the alignment of the pose and scene of the mapping data 215 of the electronic device 100 to generate a localized pose 235.

Figure 3:
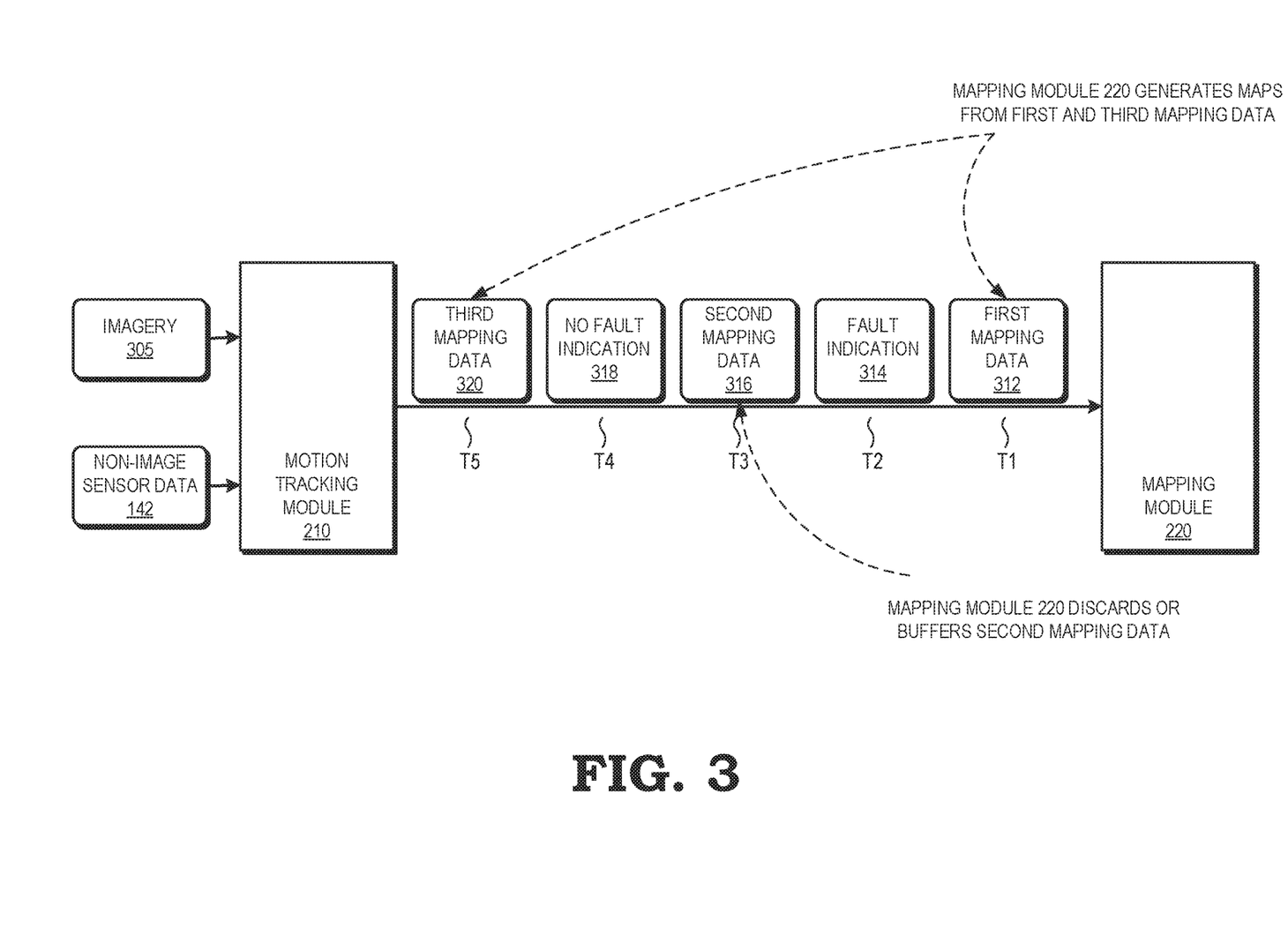
FIG. 3 is a diagram illustrating a motion tracking module of the mapper with fault detection and recovery of FIG. 2 configured to generate and transmit fault indicators and mapping data including feature descriptors of spatial features of objects in the environment to a mapping module of the mapper with fault detection and recovery of FIG. 2 for interrupting updating a map of the environment during a fault condition in accordance with at least one embodiment of the present disclosure.

FIG. 3 illustrates a motion tracking module 210 of the mapper with fault detection and recovery 150 of FIG. 2 configured to generate and transmit fault indicators and mapping data to a mapping module 220 of the mapper with fault detection and recovery 150 of FIG. 2 for interrupting updating a map of the environment during a fault condition in accordance with at least one embodiment of the present disclosure. Each of the motion tracking module 210 and the mapping module 220 represents hardware, software, or a combination thereof, configured to execute the operations as described herein. In particular, the motion tracking module 210 is configured to receive imagery 305, representing images captured by the imaging sensors 114, 116, 118, and the non-visual sensor data 142. Based on this received data, the motion tracking module generates mapping data that includes feature descriptors of spatial features of objects in the local environment 112. The motion tracking module 210 also detects whether a fault condition exists based on the imagery 305 and non-image sensor data 142, and generates indications of whether a fault condition exists. The motion tracking module 210 provides the mapping data and indications of whether a fault condition exists to the mapping module 220.

In the example illustrated in FIG. 3, at a time T1, the motion tracking module 210 provides first mapping data 312 to the mapping module 220. At time T2, the motion tracking module 210 provides a fault indication 314, indicating that a fault condition has been detected, to the mapping module 220. At time T3, the motion tracking module 210 provides second mapping data 316 to the mapping module 220. At time T4, the motion tracking module 210 provides a fault indication 318, indicating that no fault condition has been detected, to the mapping module 220. At time T5, the motion tracking module 210 provides third mapping data 320 to the mapping module 220.

In the absence of an indication of a fault condition, the mapping module 220 generates a map file based on the first mapping data 312. However, because the mapping module 220 receives the second mapping data 316 at time T3, after having received fault indication 314 at time T2, the mapping module 220 discards or buffers the second mapping data 316. At time T4, the mapping module 220 receives no fault indication 318, indicating that no fault condition has been detected. Because the mapping module 220 receives the third mapping data 320 at time T5, after receiving the no fault indication 318, the mapping module 220 generates a map file based on the third mapping data 320.

Figure 4:
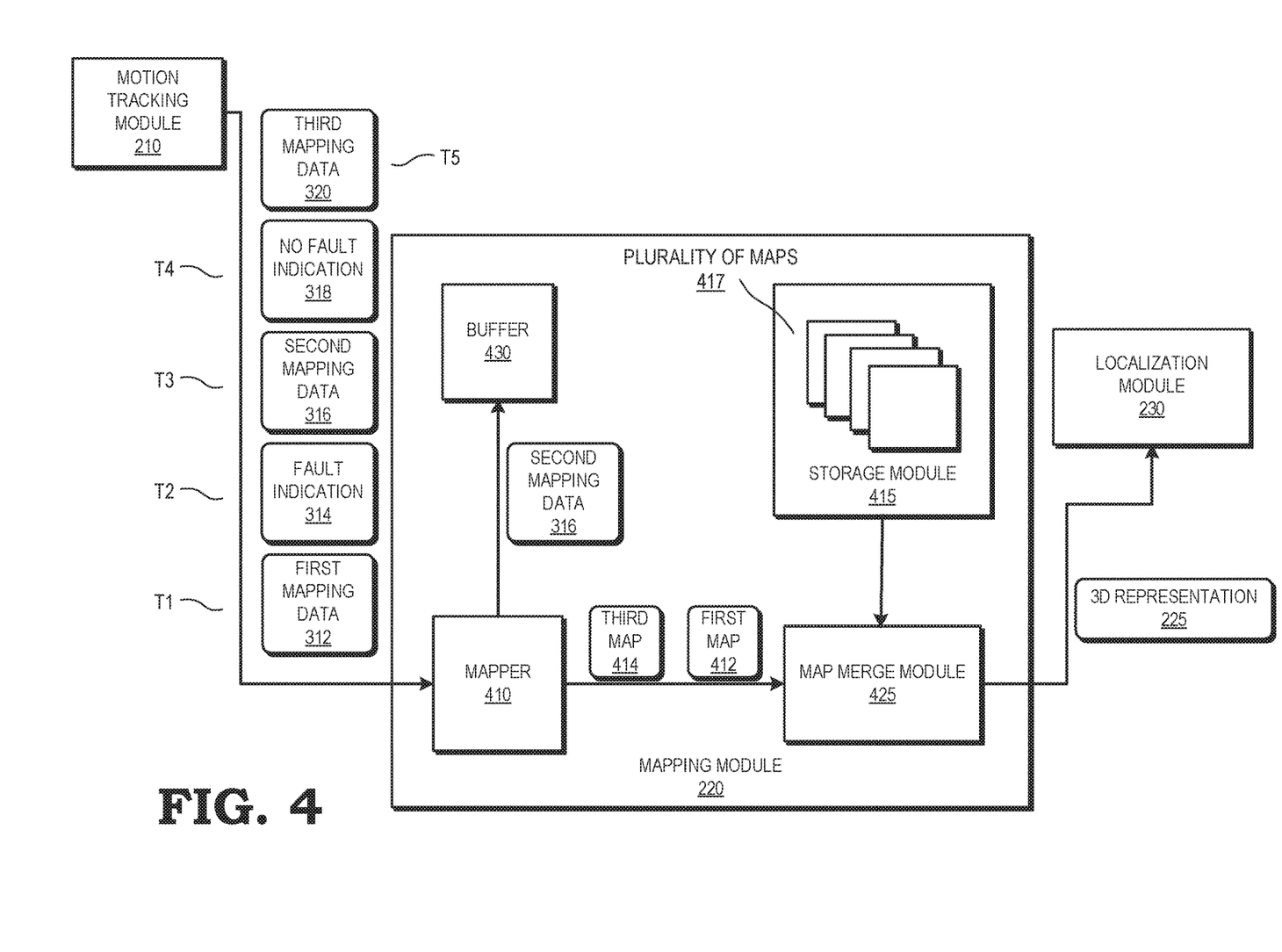
FIG. 4 is a diagram illustrating a mapping module of the mapper with fault detection and recovery of FIG. 2 configured to generate and merge maps to a three-dimensional representation of the environment of the electronic device based on mapping data including generated feature descriptors and to buffer or discard mapping data received during a fault condition in accordance with at least one embodiment of the present disclosure.

FIG. 4 is a diagram illustrating a back-end mapping module 220 of the mapper with fault detection and recovery 250 of FIG. 2 configured to generate and merge maps to a three-dimensional representation 225 of the environment 112 of the electronic device 100 based on mapping data including generated feature descriptors and to buffer or discard mapping data received during a fault condition in accordance with at least one embodiment of the present disclosure. The back-end mapping module 220 includes a mapper 410, a storage module 415, a buffer 430, and a map merge module 425.

The mapper 410 is configured to generate map files 412, 414 of the environment of the electronic device 100 based on sets of mapping data received from the motion tracking module 210. The map files 412, 414 are data structures that accumulate the mapping data for subsequent merger with other maps. The map files 412, 414 include information from visual sensors (including feature descriptors) and non-visual sensors, along with coarse mapping data received from the motion tracking module 210. The mapper 410 performs data selection and pruning on this information. The mapper 410 performs additional data associations using visual information that has been re-observed multiple times by the electronic device 100 and then processes this data to jointly optimize and estimate the device pose and build a three-dimensional representation of the environment. This data is saved in the map files 412, 414.

The storage module 415 is configured to store a plurality of maps 417 of the environment of the electronic device 100. In some embodiments, the plurality of maps 417 may include maps that were previously generated by the electronic device 100 during prior mapping sessions. In some embodiments, the plurality of maps 417 may also include VR or AR maps that contain features not found in the physical environment of the electronic device 100. The plurality of maps 417 include stored (known) feature descriptors 422 of spatial features of objects in the environment that can collectively be used to generate a three-dimensional representation 225 of the environment.

The map merge module 425 is configured to receive maps from the mapper 410. The map merge module 425 compares the feature descriptors of the maps received from the mapper 410 to the known feature descriptors of the stored plurality of maps 417. The map merge module 425 builds a three-dimensional representation 225 of the local environment 112 of the electronic device 100 based on the known feature descriptors of the stored plurality of maps 417 and the feature descriptors of the maps generated by the mapper 410 based on the mapping data received from the front-end motion tracking module 210.

The buffer 430 is configured to store mapping data received by the mapper 410 after an indication of a fault condition is received by the mapper 410 and before an indication that the fault condition has been resolved is received by the mapper 410 (i.e., mapping data received by the mapper 410 during the existence of a fault condition). Thus, the mapper 410 does not generate a map based on mapping data received during the existence of a detected fault condition, but instead buffers the mapping data at the buffer 430.

In the example depicted in FIG. 4, at time T1, the mapper 410 receives first mapping data 312 from the motion tracking module 210. At time T2, the mapper 410 receives a fault indication 314, indicating that the motion tracking module 210 has detected a fault condition. At time T3, the mapper 410 receives second mapping data 316 from the motion tracking module 210. At time T4, the mapper 410 receives a no-fault indication 318, indicating that the motion tracking module 210 has detected that no fault condition exists. At time T5, the mapper 410 receives third mapping data 320 from the motion tracking module 210.

The mapper 410 generates a first map file 412 based on the first mapping data 312 and provides the first map file 412 to the map merge module 425. The mapper 410 buffers the second mapping data 316 at the buffer 430, because the mapper 410 receives the second mapping data 316 after the fault indication 314. In some embodiments, the mapper 410 discards the second mapping data 316 instead of buffering the second mapping data 316 at the buffer 430. The mapper 410 generates a third map file 414 based on the third mapping data 320, because the mapper 410 receives the third mapping data after the no-fault indication 318.

The map merge module 425 merges the first map file 412 to the third map file 414 by querying the localization module 230 to obtain loop closure constraints between the two map files. Once such constraints have been obtained, the map merge module 425 optimizes the two map files along with inter-map constraints to accurately estimate the quantities of interest. The map merge module 425 further merges the first map file 412 and the third map file 414 with the plurality of maps 417 to generate or augment the three-dimensional representation 225 of the environment 112 of the electronic device 100.

Figure 5:
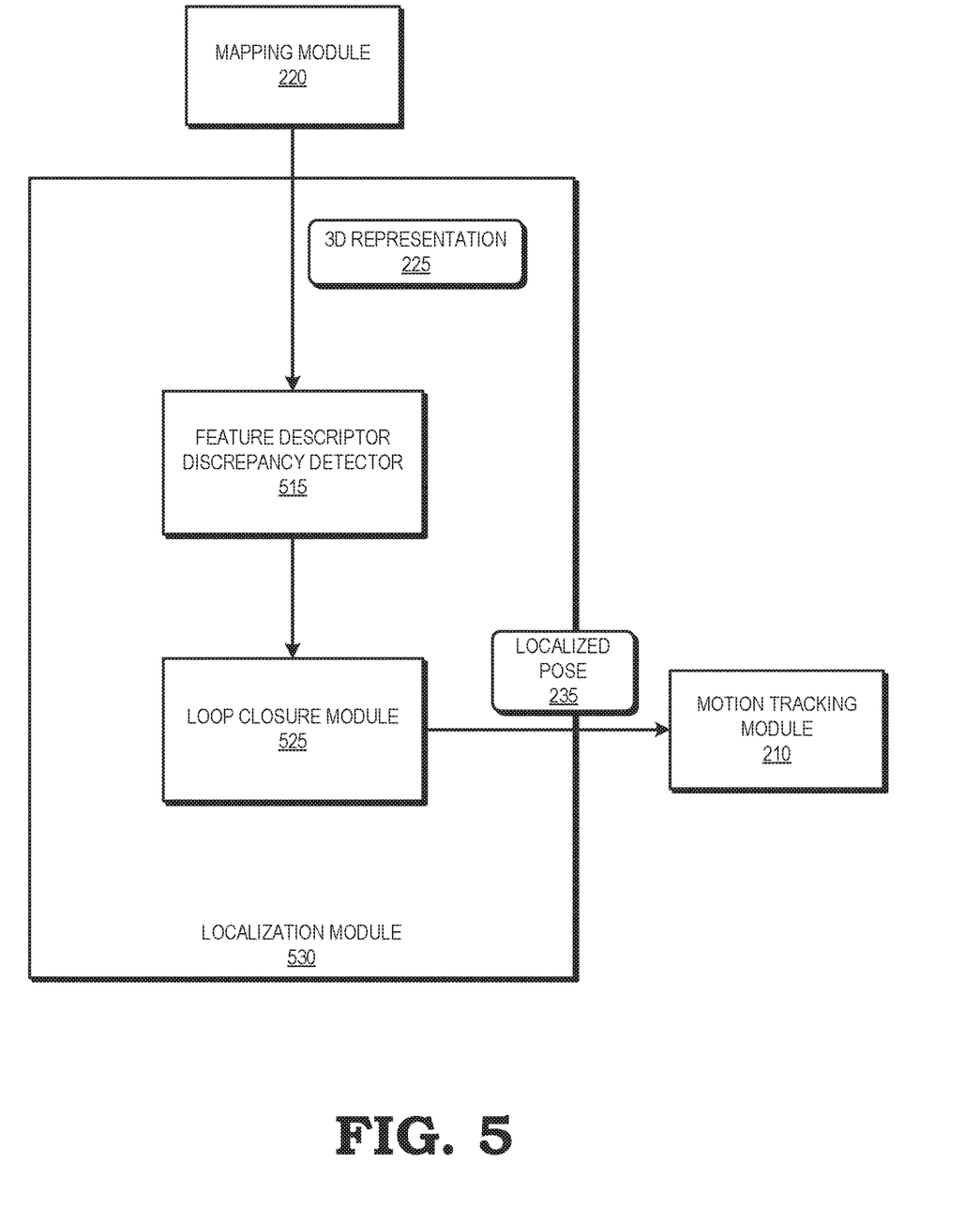
FIG. 5 is a diagram illustrating a localization module of the mapper with fault detection and recovery of FIG. 2 configured to generate a localized pose of the electronic device in accordance with at least one embodiment of the present disclosure.

FIG. 5 is a diagram illustrating a localization module 530 of the mapper with fault detection and recovery 250 of FIG. 2 configured to generate a localized pose 235 of the electronic device 100 in accordance with at least one embodiment of the present disclosure. The localization module 530 includes a feature descriptor discrepancy detector 515 and a loop closure module 525.

The feature descriptor discrepancy detector 515 is configured to receive a three-dimensional representation 225 of the environment from the back-end mapping module 220 of the mapper with fault detection and recovery 250. The feature descriptor discrepancy detector 515 analyses the matched feature descriptors of the three-dimensional representation 225 and identifies discrepancies between matched feature descriptors. The feature descriptor discrepancy detector 515 transforms geometric data associated with the generated feature descriptors of the mapping data 215 having matching descriptors to be aligned with geometric data associated with a stored map having a corresponding matching descriptor. When the localization module 230 finds a sufficient number of matching feature descriptors from the mapping data 215 and a stored map to confirm that the mapping data 215 and the stored map contain descriptions of common visual landmarks, the localization module 230 performs a transformation between the mapping data 215 and the matching known feature descriptors, aligning the geometric data of the matching feature descriptors.

The loop closure module 525 is configured to optimize the three-dimensional representation 225 by solving a co-optimization algorithm to refine the alignment of the matching feature descriptors. The co-optimization problem may be solved by a Gauss-Newton or Levenberg-Marquardt algorithm, or another known algorithm for optimizing transformations to generate a localized pose 235 of the electronic device 100. In some embodiments, the loop closure module 525 treats known feature descriptors as variable. The loop closure module 525 thus generates a localized pose 235, and sends the localized pose 235 to the front-end motion tracking module 210. The localized pose 235 can be fed to an application executing at the electronic device 100 to enable augmented reality or other location-based functionality by allowing the electronic device 100 to more efficiently and accurately recognize a local environment 112 that it has previously traversed.

Figure 6:
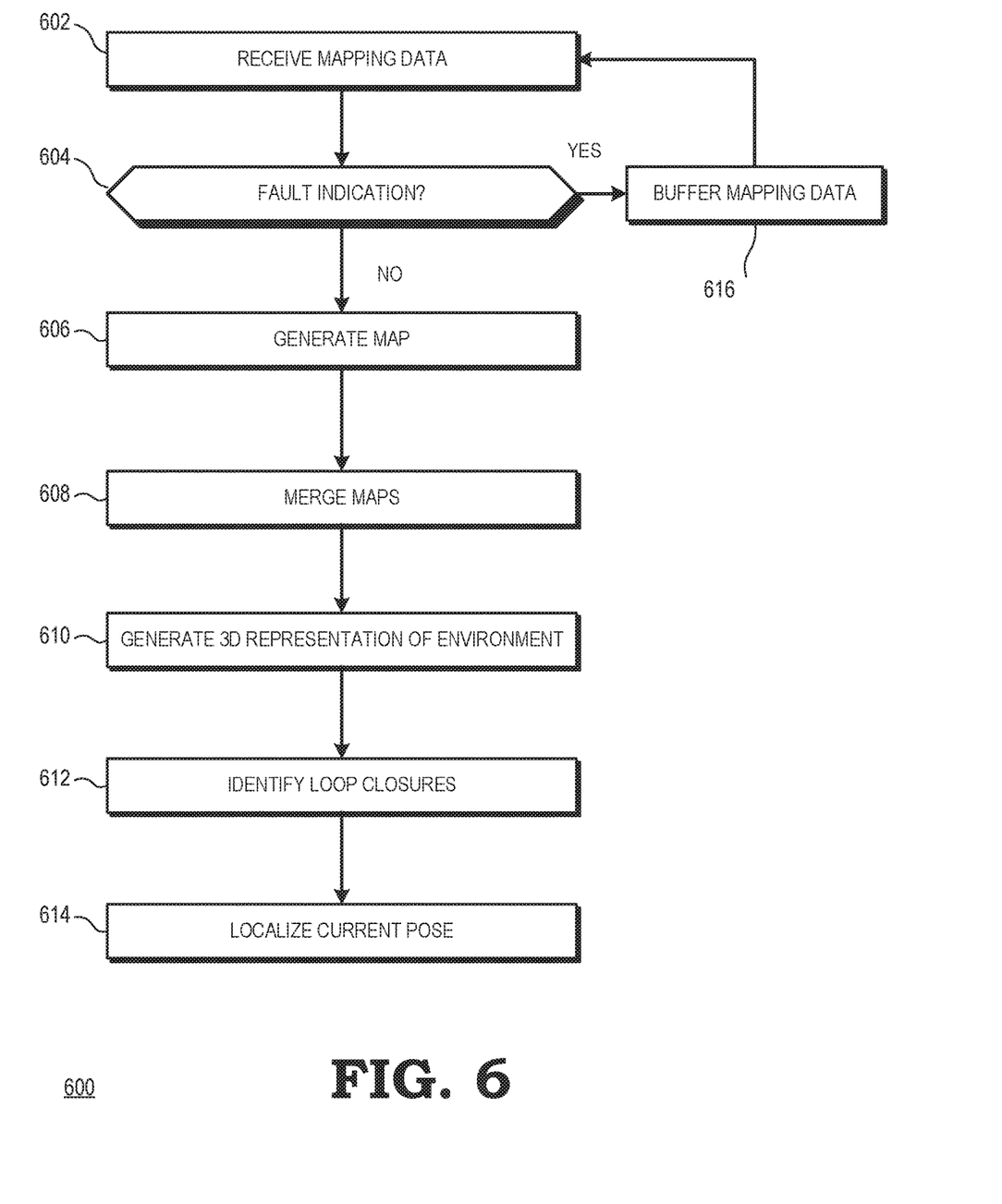
FIG. 6 is a flow diagram illustrating an operation of an electronic device to detect and recover from fault conditions while tracking motion and updating a three-dimensional representation of the environment in accordance with at least one embodiment of the present disclosure.

FIG. 6 is a flow diagram illustrating a method 600 of an electronic device 100 to detect faults and recover while tracking motion and updating a three-dimensional representation of the environment in accordance with at least one embodiment of the present disclosure. The method 600 initiates at block 602 where the mapping module 220 of the mapper with fault detection and recovery 250 receives mapping data from the motion tracking module 210 based on imagery and non-visual data captured by the electronic device 100 as it is moved by a user through different poses in a local environment. At block 604, the mapping module 220 determines whether it has received an indication that a fault condition exists. If the mapping module determines that it has received an indication that a fault condition exists, at block 616, the mapping module 220 buffers the received mapping data, and the method flow continues to block 602, where the mapping module 220 receives additional mapping data. If, at block 604, the mapping module 220 determines that it has not received an indication that a fault condition exists (or, that it has received an indication that a fault condition has resolved), the method flow continues to block 606. At block 606, the mapping module 220 uses the mapping data 215 to generate a map file of the electronic device 100 in the local environment 112.

At block 608, the mapping module 220 merges the generated map files by querying the localization module 230 to obtain loop closure constraints between the two map files. At block 610, the mapping module 220 builds and/or updates a three-dimensional representation 225 of the environment of the electronic device which it provides to the localization module 230. At block 612, the localization module 230 identifies discrepancies between matching feature descriptors and performs a loop closure to align the mapping data with the three-dimensional representation 225. At block 614, the localization module localizes the current pose of the electronic device, and the mapper with fault detection and recovery 250 provides the localized pose to an API module 240.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
    modifying, at an electronic device, a three-dimensional representation of an environment of the electronic device based on known feature descriptors of a stored plurality of maps of the environment that were previously generated by the electronic device during prior mapping sessions and a first map file comprising accumulated first mapping data received from a motion tracking module, wherein the first mapping data is based on images captured from one or more visual sensors and non-visual data from one or more non-image sensors;
    in response to receiving a second map file comprising accumulated second mapping data from the motion tracking module after receiving an indication from the motion tracking module that a fault condition exists, wherein the fault condition comprises the electronic device changing direction at a rate that exceeds a rate at which the motion tracking module can generate accurate mapping data, buffering or discarding the second map file and omitting the second map file from the three-dimensional representation;
    discontinuing buffering or discarding the second map file in response to receiving an indication from the motion tracking module that the fault condition has resolved; and
    in response to receiving a third map file comprising accumulated third mapping data from the motion tracking module after receiving an indication from the motion tracking module that the fault condition has resolved, modifying the three-dimensional representation based on the third map file.

2. The method of claim 1, wherein the first, second, and third mapping data comprise feature descriptors of one or more spatial features representing an object in the environment of the electronic device, and wherein modifying the three-dimensional representation based on the third map file comprises matching feature descriptors of the third mapping data to feature descriptors of the first mapping data.

3. The method of claim 2, further comprising building a bundle adjustment problem comprising the feature descriptors of the three-dimensional representation and solving the bundle adjustment problem to generate a localized pose of the electronic device.

4. The method of claim 2, wherein modifying the three-dimensional representation based on the third map file comprises matching feature descriptors of the third mapping data to feature descriptors of the three-dimensional representation.

5. The method of claim 1, further comprising detecting, at the motion tracking module, existence of the fault condition.

6. The method of claim 5, wherein detecting occurs at a frequency that is substantially the same as an operating frequency of the one or more visual sensors.

7. The method of claim 1, wherein the fault condition further comprises the images captured from the one or more visual sensors comprising less than a threshold amount of information.

8. A method, comprising:
    generating, at an electronic device, a three-dimensional representation of an environment of the electronic device based on known feature descriptors of a stored plurality of maps of the environment that were previously generated by the electronic device during prior mapping sessions and a first map file comprising accumulated first mapping data received from a motion tracking module of the electronic device, the first mapping data comprising feature descriptors of one or more spatial features representing an object in the environment of the electronic device based on images captured from one or more visual sensors and non-visual data from one or more non-image sensors;
    in response to receiving from the motion tracking module an indication of a fault condition, wherein the fault condition comprises the electronic device changing direction at a rate that exceeds a rate at which the motion tracking module can generate accurate mapping data, interrupting generating the three-dimensional representation of the environment; and
    in response to receiving an indication from the motion tracking module that the fault condition has resolved, resuming generating the three-dimensional representation based on a second map file comprising accumulated second mapping data received from the motion tracking module after the indication that the fault condition has resolved.

9. The method of claim 8, wherein resuming generating the three-dimensional representation comprises matching feature descriptors of the second mapping data to feature descriptors of the three-dimensional representation.

10. The method of claim 8, further comprising building a bundle adjustment problem comprising the feature descriptors of the three-dimensional representation and solving the bundle adjustment problem to generate a localized pose of the electronic device.

11. The method of claim 8, further comprising detecting, at the motion tracking module, existence of the fault condition.

12. The method of claim 11, wherein detecting occurs at a frequency that is substantially the same as an operating frequency of the one or more visual sensors.

13. The method of claim 8, wherein the fault condition further comprises the images captured from the one or more visual sensors comprising less than a threshold amount of information.

14. An electronic device, comprising:
    a motion tracking module configured to track motion of the electronic device relative to an environment of the electronic device based on mapping data comprising feature descriptors of one or more spatial features representing one or more objects in the environment and to indicate a fault condition, wherein the feature descriptors are generated based on images captured from one or more visual sensors and non-visual data from one or more non-image sensors; and a mapping module configured to generate a three-dimensional representation of the environment of the electronic device based on known feature descriptors of a stored plurality of maps of the environment that were previously generated by the electronic device during prior mapping sessions and first mapping data received from the motion tracking module, wherein the mapping module is further configured to interrupt generating the three-dimensional representation of the environment in response to receiving from the motion tracking module an indication of a fault condition, wherein the fault condition comprises the electronic device changing direction at a rate that exceeds a rate at which the motion tracking module can generate accurate mapping data, and, in response to receiving an indication from the motion tracking module that the fault condition has resolved, resume generating the three-dimensional representation based on the known feature descriptors of the stored plurality of maps and second mapping data received from the motion tracking module after the indication that the fault condition has resolved.

15. The electronic device of claim 14, wherein the mapping module is configured to resume generating the three-dimensional representation by matching feature descriptors of the second mapping data to feature descriptors of the three-dimensional representation.

16. The electronic device of claim 14, further comprising a loop-closure module configured to build and solve a bundle adjustment problem comprising the feature descriptors of the three-dimensional representation to generate a localized pose of the electronic device.

17. The electronic device of claim 14, wherein the motion tracking module is further configured to detect a fault condition at a frequency that is substantially the same as an operating frequency of the one or more visual sensors.

18. The electronic device of claim 14, wherein the fault condition further comprises the images captured from the one or more visual sensors comprising less than a threshold amount of information.

\* \* \* \* \*